United States Patent [19]

Bergeron

[11] 4,199,842

[45] Apr. 29, 1980

[54] FEATHER REMOVING APPARATUS AND METHOD

[76] Inventor: Camille F. Bergeron, Rte. 1, Box 98, Broussard, La. 70518

[21] Appl. No.: 958,608

[22] Filed: Nov. 8, 1978

[51] Int. Cl.² .............................................. A22C 21/02
[52] U.S. Cl. ..................................... 17/47; 17/11.1 R
[58] Field of Search .............................. 17/11.1 R, 47

[56] References Cited

U.S. PATENT DOCUMENTS

| | | | |
|---|---|---|---|
| 1,737,226 | 11/1929 | Dunner | 17/11.1 R |
| 2,206,731 | 7/1940 | Schlicksupp | 17/11.1 R |
| 2,389,006 | 11/1945 | Smith | 17/11.1 R |
| 3,911,530 | 10/1975 | Kalfsbeek et al. | 17/11.1 R |

Primary Examiner—Willie G. Abercrombie
Attorney, Agent, or Firm—Guy E. Matthews

[57] ABSTRACT

A device for removing feathers from a fowl utilizing a rotating drum having radially extending flailing members, enclosed within a venturi-shaped housing having a fan for creating a flow of air to collect and exhaust the removed feathers out the smaller end thereof. The device permits the operator to manually position the fowl against the feather removing means from outside the device, thereby precluding removed feathers, and the odor therefrom, from permeating the air about the operator.

2 Claims, 1 Drawing Figure

U.S. Patent
Apr. 29, 1980
4,199,842
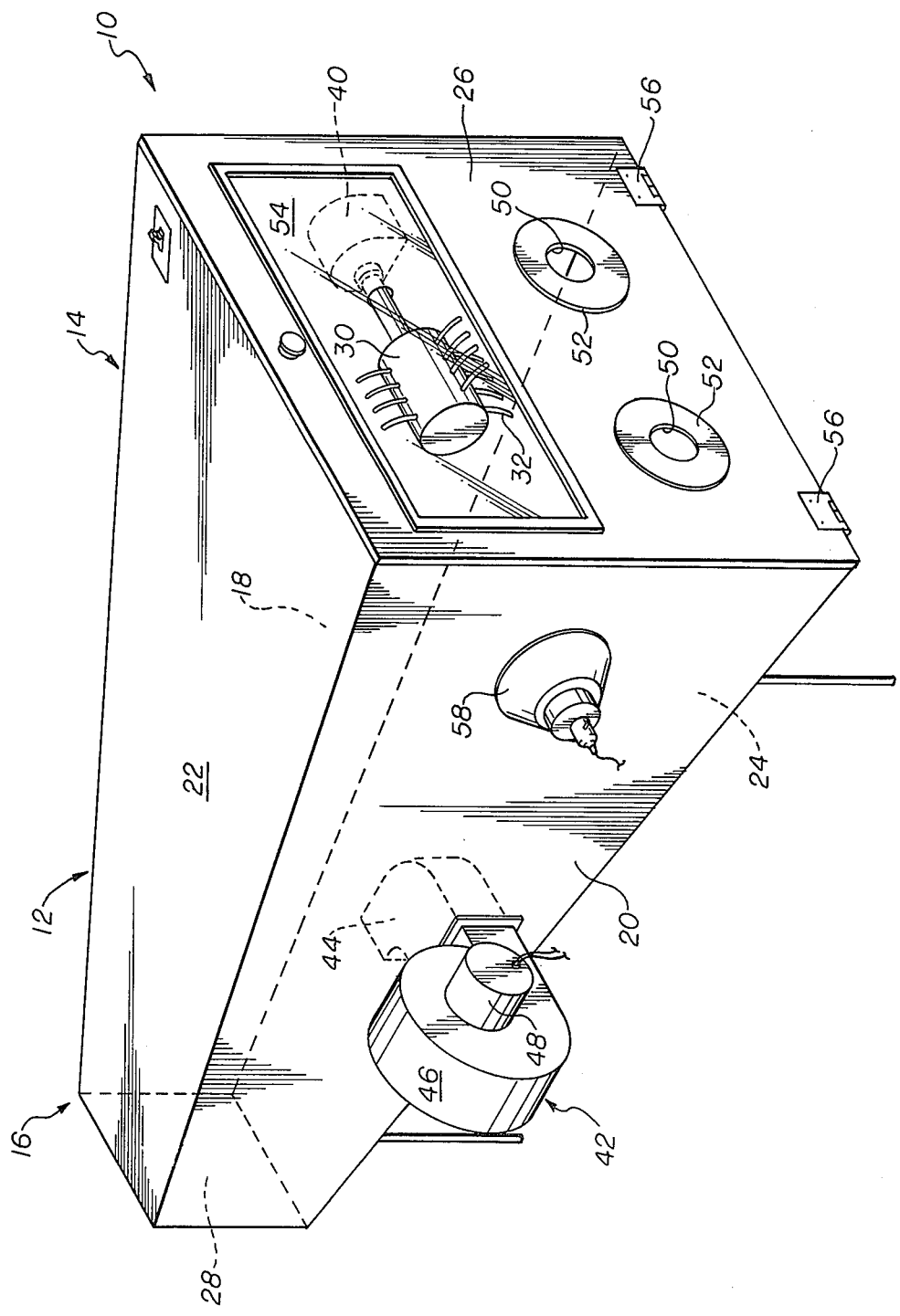

FEATHER REMOVING APPARATUS AND METHOD

SUMMARY OF THE INVENTION

The present invention relates generally to a method and apparatus for removing feathers and down from a fowl and more specificaly to a rotating drum of flailing members positioned within a venturishaped housing containing a means for generating an air flow within the housing and exhausting such flow and removed feathers and down out the smaller end of the venturi housing in response to the pressure differential and air flow velocity differential created within the venturi. The housing is enclosed such that the removed feathers and down are not strewn about, and such that the odor of fowl feathers does not permeate the operator's work area.

The use of a rotating drum having radially extending rubber fingers is not new to the art, as is shown by Campbell U.S. Pat. No. 2,376,120, Zebarth U.S. Pat. No. 2,908,033 and Pitts U.S. Pat. No. 2,777,159. Each of the aforementioned devices incorporates no adequate means of collecting the feathers once removed from the fowl. Other devices incorporate suctions fans or the like for this purpose with the effect of unnecessarily channelling removed feathers through the suction mechanism or fan. None of the prior art devices incorporate a means whereby an operator could manually position the bird adjacent the feather removing device in order to observe and more effectively perform the feather removing operation, and also a means for exhausting the removed feathers, and the odor therefrom, away from the operator and into a suitable receptacle.

It is therefore an object of the present invention to provide a device which permits the operator to manually hold a fowl during the feather plucking operation, thereby obtaining optimum cleaning thereof.

It is a further object of the present invention to provide an enclosed housing which precludes loose feathers, and the odor therefrom, from being strewn about and permeating the air around the operator.

It is a further object of the present invention to utilize a venturi-shaped housing and a blower to create an air flow to collect removed feathers and exhaust them, and the odor therefrom, into a suitable receptacle without passing the feathers through the suction mechanism or fan.

BRIEF DESCRIPTION OF THE DRAWING

Other objects and advantages of the invention will become apparent upon a careful reading of the following detailed description of the invention, the claims and the drawing, in which like reference characters are used throughout to denote like parts, wherein:

FIG. 1 is an isometric view of the feather plucking device.

While the invention will be described in connection with a preferred embodiment, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Turning now to the drawing, the feather plucking device is shown generally illustrated at 10, comprising a housing 12, an internal rotatable means or drum 30 for removing feathers from a fowl, and an air flow generator 42 for directing the removed feathers out of the housing.

The housing 12 comprises a large section 14 and a small section 16 formed by a right tapered side wall 18, a left tapered side wall 20, a tapered top 22 and a tapered bottom 24. Located at the end of the small section 16 is discharge orifice 28 through which removed feathers are ejected into an appropriate receptacle (not shown).

The air flow generator 42 comprises an internal curved deflector or direction tunnel 44, an external cylinder fan 46 and an electric motor 48. As shown in the drawing, the curved deflector 44 directs the air flow from the fan 46 to the discharge orifice 28, and works with the housing 12 to create a flow of air from the larger section 14 to the smaller section 16 thereof.

The preferred embodiment of the housing 12 comprises 4 tapered walls 18, 20, 22 and 24, that form a venturi-shape to the housing 12. The venturi housing 12 works with the air flow generator 42 to create a flow of air from within the large section 14 through the small section 16 and out the exit discharge orifice 28 at the smaller end thereof. From a simple knowledge of fluid flow through a venturi-shaped tunnel, it is readily appreciated that this flow of air at a given initial velocity is accompanied by a decrease in static pressure proportional to the increase in fluid velocity through the venturi. Air flow through the large section 14 of the housing 12 is at a substantially lower initial velocity, thereby giving rise to a higher pressure differential between the large and small sections, 14 and 16, respectfully. This higher velocity and corresponding lower pressure through the small section 16 combine to draw loose feathers removed in the large section 14 through the small section and out the discharge orifice 28 into a bag or other suitable receptacle (not shown) for collection.

Means is provided for removing the feathers and down from a duck or other fowl, comprising a rotatable means or drum 30 positioned within the large section 14 of the housing 12 and adapted to rotate along its center cylindrical axis transverse to the flow of air within the housing. This rotatable means 30 includes a plurality of flailing members or fingers 32 extending radially outwardly therefrom for removing feathers from the bird. These flailing fingers 32 are sufficiently resilient to support their own weight and remove feathers and down from a fowl held in close proximity therewith as the rotating drum 30 rotates about its axis, yet are sufficiently flexible to yield to the body of the fowl to prevent bruising or scratching the body as the feathers are being removed. In the preferred embodiment, these flailing fingers 32 are constructed of a soft rubber having a significant friction effect upon the bird feathers in order to "grasp" and "jerk" the feathers straight out from the bird, as opposed to bending, and chance breaking, the feathers during removal.

The rotatable drum 30 is driven by an electric motor 40 at a rate to sufficiently remove all feathers and down from the fowl without bruising the bird or injuring the operator's hand, should it come in contact with the rotating flailing fingers 32.

The venturi-shaped housing 12 includes a large section end or door 26 that prevents feathers and down from flying about in the room as the operator de-feathers his catch. It will also be appreciated that the closed housing 12 restricts, if not totally precludes, the foul odor of fowl and feathers from permeating the operator's work area. This large section end 26 includes access passageways 50 covered by restrictive means 52 which permit air to flow into the large section 14 around the operator's forearms and elbows, but is so designed to prevent feathers and down from escaping through the access passageways 50. In the preferred embodiment, this restrictive means 52 is in the form of a rubber sleeve which gives the operator sufficient freedom of movement to manipulate a duck or fowl inside the housing 12 from without the housing in order to more efficiently remove feathers and down from the bird.

The preferred embodiment includes a window 54 mounted with the large section end door 26 permitting the operator to observe the fowl as he manipulates same within the feather plucking housing 12 to de-feather the bird. The door is mounted by hinges 56 or any other suitable means permitting the operator to open the door and insert a fowl in the housing 12 and then close the door while holding the fowl in one of his hands extended through an access passageway 50 into the large section 14 of the housing.

The preferred embodiment also includes a light 56 located in a manner so as to illuminate the interior of the large section 14 to permit the operator to more easily observe the bird held within.

In operation, the operator opens the large section end door 26 slightly while inserting one hand and forearm through an access passageway 50 therein. He next places the bird to be de-feathered in the hand within the housing 12 and closes the door. By activating a switch, he simultaneously supplies electric current to the air flow generator motor 48, the rotatable drum motor 40 and the interior light 58 to turn the system 10 on.

As the drum 30 rotates, the flailing fingers 32 slap at the bird held within the housing to remove the feathers and down from the bird and initially direct them toward the smaller section 16 of the housing. The air flow generator 42 creates a pressure differential between the large and small sections 14 and 16 so that the lower pressure and increased air flow velocity within the smaller section operate to suck loose feathers and down from the large section, through the small section and out the discharge orifice 28. The window 54 permits the operator to observe the fowl within and to use human judgement and dexterity to manually, by mechanical assistance, remove the feathers and down from the bird without bruising or otherwise injuring the meat on the bird.

When the operator determines that the bird has been sufficiently cleaned, he turns off the electric power to the device, opens the door 26 and removes the bird therefrom. Alternatively, the operator can open the door 26 first and remove the bird while the air flow generator 42 continues to evacuate the interior of the housing 12. The blast of air through the housing caused by the sudden opening of the door 26 collects any loose feathers and down within the housing and blows them out the discharge orifice 28 into a suitable receptacle for collection.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A device for plucking feathers from fowl and the like comprising:
    (a) a housing having a large and a small section, tapered walls that form a venturi-shape, and including a discharge orifice at said small section thereof;
    (b) a rotatable means positioned within said larger section of said housing;
    (c) a plurality of elongated resilient flailing members mounted with said rotatable means and extending radially outwardly therefrom for removing feathers and the like from a fowl positioned adjacent said rotatable means;
    (d) means mounted with said housing for creating a flow of air from within said large section of said housing to said small section thereof, and exhausting the air flow out said discharge orifice;
    (e) passageways mounted within said large section of said housing for permitting an operator to insert his hands into said housing to hold a fowl or the like in position as said rotatable means removes the feathers from the fowl, said passageways restricting the flow of air around the operator's arms and into said large section for collecting the removed feathers and exhausting the feathers out said discharge orifice; and
    (f) a window mounted within said large housing section whereby the operator may observe the fowl therein being plucked of its feathers.

2. A method for removing feathers from a fowl comprising:
    (1) providing a feather removing apparatus comprising:
        (a) a venturi-shaped housing including a discharge orifice at a smaller end thereof;
        (b) an internal rotatable means having radially extending resilient feather removing fingers;
        (c) an internal means for creating a flow of air from a larger section to a smaller section of said housing and exhausting the air out said discharge orifice;
        (d) means mounted with said housing to permit an operator to insert his hands into said housing to hold a fowl or the like in position as said rotatable means removes the feathers from the fowl; and
        (e) means for permitting the operator to observe a fowl position therein being plucked of its feathers;
    (2) positioning a fowl inside the feather removing apparatus;
    (3) manually holding the fowl inside the apparatus from outside thereof during the feather removing process;
    (4) manually positioning the fowl against said rotatable means fingers while observing the fowl from without for more effectively removing the feathers therefrom;
    (5) ejecting the removed feathers from said feather removing apparatus;
    (6) collecting the removed feathers as they are ejected from said feather removing apparatus;
    (7) removing the fowl from said apparatus following removal of its feathers.

* * * * *